(12) United States Patent
Högl et al.

(10) Patent No.: US 6,582,168 B2
(45) Date of Patent: Jun. 24, 2003

(54) MACHINE TOOL

(75) Inventors: Josef Högl, Mindelheim (DE); Fritz Windel, Landsberg a. Lech (DE)

(73) Assignee: Grob-Werke Dr. h.c. mult. Dipl.-Ing Burkhart Grob e.K., Mindelheim (DE)

( * ) Notice: Subject to any disclaimer, the term of this patent is extended or adjusted under 35 U.S.C. 154(b) by 0 days.

(21) Appl. No.: 09/748,218

(22) Filed: Dec. 27, 2000

(65) Prior Publication Data

US 2001/0006595 A1 Jul. 5, 2001

(30) Foreign Application Priority Data

Dec. 27, 1999 (DE) .......................... 199 63 342

(51) Int. Cl.⁷ .............................. B23C 1/027
(52) U.S. Cl. ................. 409/190; 408/234; 409/206; 409/235
(58) Field of Search ................ 409/191, 190, 409/201, 203, 206, 211, 134, 235; 408/234

(56) References Cited

U.S. PATENT DOCUMENTS

| | | | | |
|---|---|---|---|---|
| 5,267,818 A | * | 12/1993 | Marantette | ............... 144/135.4 |
| 5,807,044 A | * | 9/1998 | Watari et al. | ............... 408/236 |
| 6,059,703 A | * | 5/2000 | Heisel et al. | ............... 248/631 |
| 6,099,217 A | * | 8/2000 | Wiegand et al. | ............ 408/234 |
| 6,161,992 A | * | 12/2000 | Holy et al. | ............... 160/210 |
| 6,217,496 B1 | * | 4/2001 | Lindem | ...................... 408/234 |
| 6,328,510 B1 | * | 12/2001 | Hanrath et al. | .............. 33/1 M |

FOREIGN PATENT DOCUMENTS

DE       2223392 A   *  11/1973   ................. 409/199

* cited by examiner

Primary Examiner—Daniel W. Howell
(74) Attorney, Agent, or Firm—Jacobson Holman PLLC

(57) ABSTRACT

A machine tool having at least one tool spindle which can be moved and positioned in at least one working plane by a movement system. It is proposed to produce the movement system from at least two guide rods connected to one another in an articulated manner by a guide rod joint, and that in the process, the free ends of the guide rods can be moved in opposite relative directions towards and apart from one another and/or in the same direction as one another.

14 Claims, 3 Drawing Sheets

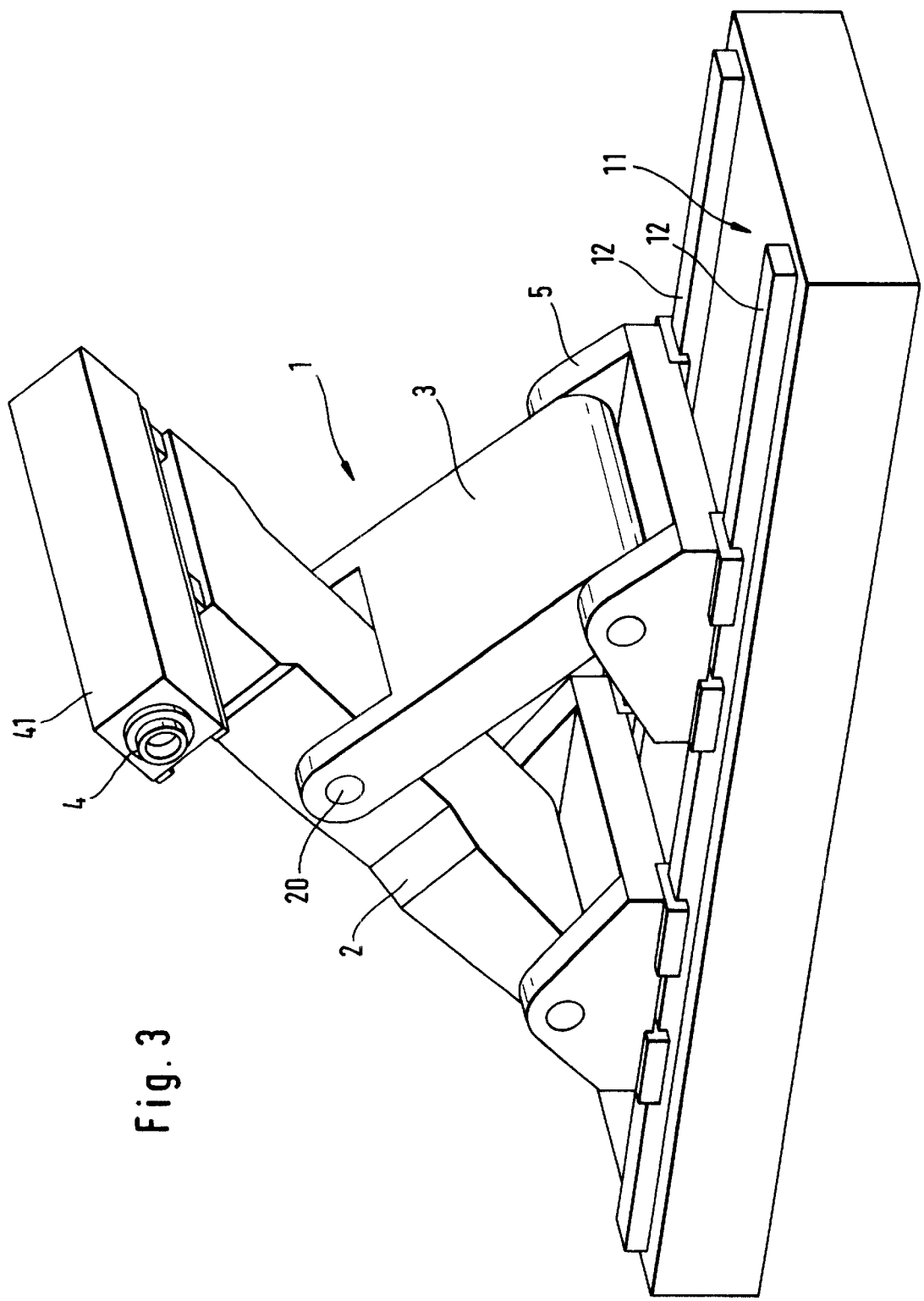

MACHINE TOOL

BACKGROUND OF THE INVENTION

The invention relates to a machine tool consisting of at least one tool spindle which can be moved and positioned in at least one working plane by a movement system.

The above-mentioned machine tools are well known in the engineering industry. They are often used in transfer lines, assembly centres, machining centres and the like. They are characterised by a high degree of flexibility and moveability and are capable of carrying not only one but a plurality of tool spindles simultaneously, the tool spindles also driving various tools for example. It is also known to connect intelligent tool replacement systems or tool magazines to the machine tools in order to increase the efficiency of such machine tools.

The tool spindle is to be positioned in relation to the tool in at least one plane, the working plane, by a movement system. It is also quite possible to position the machine tool in relation to further axes. There are, for example, so-called stages with X and Y movements in which a first carrier has a second carrier which can be moved on the first carrier and therefore provides a movable movement system for the tool spindle at least in one plane. These arrangements are also known as "Cartesian machines", in other words the relevant axes of movement are arranged at right angles to one another.

The disadvantage with this development is that the first carrier has to be designed so as to be very large as it has to carry and bear not only the weight of the tool spindle and the working force to be exerted but must also in addition bear the weight of the second carrier. On the basis of this principle, this leads to relatively large and heavy machine tools.

On the basis of this known principle, large drive units have to be provided in order to accelerate the high masses in a tolerable amount of time, so the machining times cannot increase too greatly. Therefore, not only the bulky design of such a machine tool but also the more complex drives required lead to increased costs in such machine tools.

The object of the invention therefore is to provide a machine tool, as described at the start, which is simple and economical in terms of production and simultaneously permits a high machining speed.

BRIEF SUMMARY OF THE INVENTION

This object is achieved with a machine tool, as described at the start, in which the movement system comprises at least two guide rods which are connected to one another in an articulated manner by a guide rod joint, each of said guide rods having a free end, said free ends of the guide rods being moveable in opposite relative directions towards and apart from one another and/or in the same direction as one another.

The constructional assembly of parts of the movement system on top of one another is avoided as a result of this concept of the movement system. The two guide rods, which are connected to one another by a guide rod joint, effect a movement in the working plane of the tool spindle. Depending on whether the guide rods move towards one another or apart from one another, the work spindle moves in a first dimension. If the two guide rods move in the same direction, a second dimension results which is arranged at right angles to the first dimension and therefore defines a substantially freely determinable working face which can be covered by the tool spindle. A relative movement of the two guide rods towards one another is also sufficient for the first dimension, in other words, one guide rod can, for example, also remain stationary. A similar effect can be achieved through appropriate selection of the guide rod lengths and the arrangement of the guide rod joint on the guide rods.

The tower-like stage arrangement with X and Y movements of the machine tools results from the proposal according to the invention and a considerably simpler machine tool is produced with considerably lower masses as these no longer have to mutually support one another. This means that not only a smaller number of components is possible—only two guide rods which are connected in an articulated manner and which can be moved towards one another are substantially required for this purpose, and also, owing to the lower masses, smaller and therefore more favourable drives are required in order to achieve the same accelerations according to Newton's law of motion. The tool spindle is therefore positioned with smaller drives in the same amount of time, so the cost of the drive for the movement system is lower than that of the known stage arrangements with X and Y movements whilst retaining the same speed.

The invention does not prevent more than just two guide rods being provided according to the invention. The same also applies to the number of guide rod joints. It is possible, for example, to use the above-mentioned principle in the context of scissor kinematics and the like, for example.

In a preferred development of the invention, it is provided that the guide rods rest on the same plane. As an alternative to this, it is of course also possible to mount the guide rods at different levels in order to achieve specific geometric relationships. Similarly, according to the invention, it is also conceivable that the arrangement is mounted not only on one plane—it is also possible in the same manner that the guide rods are arranged so as to be suspended on a plane or supported on a plane extending substantially vertically. Appropriate guides are provided for the guide rods for this purpose.

Furthermore, it is favourable if the guide rod is mounted in an articulated manner on a guide rod base by a base joint. In the process, the guide rod base forms for example the slide on a track for movement of the guide rod. In order to achieve appropriate stability of the machine tool, it is obviously provided that the guide rod base can be mounted on a plurality of tracks which run in parallel. As an alternative to a guide rod base, and also acting similarly thereto, the guide rod in the lower region rests on a rotatable element, for example a roller or the like, the axis of rotation of this roller is then at the same time also being the axis of rotation of the "base joint".

A ball spindle, a linear drive, a chain or belt drive, or a rack and pinion arrangement, for example, is provided as a drive for the guide rod or the guide rod base. The drive effects the movement of the guide rods in the same direction or in opposite directions in order to move either the tool spindle in the direction of the track (when moving with one another) or at right angles thereto (when moving in opposite directions to one another). In this case it does not matter whether the above-described drives act directly on the guide rod base or act on parts of the guide rod which are then optionally movably mounted.

The design of the drives is of course very important as the tool spindle is ultimately positioned relative to the workpiece to be machined by precise positioning of the drives. Known control means are used here, the respective geometric relationships being taken into account for positioning of the tool spindle.

In the conventional manner, the drive control is appropriately provided with data by the machine control device in order to execute appropriate positioning. The entire process preferably takes place in this case using microprocessor-aided control devices and is, for example, appropriately carried out in a comprehensively integrated manner in more complex transfer lines or machining centres.

In a preferred development of the invention, it is provided that the axis of rotation of the tool spindle can be oriented or adjusted so as to be parallel, at right angles or at any angle to the axis of rotation of the guide rod joint. In a first embodiment the machine tool is designed as a three-axis machine. The tool spindle can be moved at right angles to the working plane predetermined by the guide rod so the axis of rotation of the tool spindle is parallel to the joint axis of the guide rod joint. It is also possible, however, to select an arrangement at right angles thereto in order to achieve a forward movement of the tool spindle in axis direction, for example, as a result of the movement of the guide rods. Greater flexibility is achieved if the spindle can be moved relative to the movement system, for example is rotatably mounted about a fourth axis. As a result, it is also possible to carry out relatively complex operations using the four-axis machine thus produced.

It is also proposed that the entire movement system is arranged on a slide which can be moved separately. The guide rods are movably mounted on the slide, for example by the already described guide rod bases. As a result of such a development, the working face can be considerably expanded parallel to the direction of movement of the slide and a larger working space can be provided for the work spindle as a result. At the same time it is possible to implement still quicker positioning owing to superimposition of the movement of the slide and of the movement of the guide rod on the slide.

In a preferred development it is also provided that the guide rods are of the same length. The length of a guide rod is determined in this case by the spacing of the relevant axes. In this case, the spacing between the joint axis (guide rod joint) and the base axis (base joint) is to be considered. With such geometry, the guide rod joint is always located between the two guide rod bases or the respective base joints. The work spindle is then also preferably arranged in the vicinity of the guide rod joint in order to exploit these geometric properties for positioning of the tool spindle.

Alternatively, however, it is also possible that the guide rods are of different lengths in the context of the invention and the longer first guide rod carries the tool spindle. As a result it is possible, with appropriate control and appropriate dimensioning of the relevant guide rod lengths, to cover relatively complicated machining curves with the work spindle.

It is also proposed according to the invention in this case that the guide rod joint on the first guide rod is located between the drive spindle and the guide rod base. As an alternative to this, it is also quite possible for the drive spindle to be located between guide rod joint and guide rod base.

In a preferred development according to the invention, it is provided that the guide rod joint is located in the middle of the first guide rod. This means that the distance between the joint axis and the base axis of the base joint of the first guide rod is the same as the distance between the joint axis and the axis of rotation of the drive spindle. This of course assumes that the drive spindle is oriented or can be oriented parallel to the joint axis.

Relationships which are relatively simple and favourable for the operation are also created in particular if the length of the second short guide rod corresponds to the length of the portion of guide rod of the first guide rod from guide rod joint to tool spindle. As a result, viewed from the perspective of the guide rod joint, the distance to the base joint of the shorter guide rod is the same as the distance to the work spindle. These two parts therefore form an isosceles triangle. Three parts of equal length, namely the first shorter guide rod and the two parts on the longer first guide rod result in particular if the guide rod joint is now arranged in the middle of the first larger guide rod. As a result, the axis of rotation of the work spindle is always located above the base axis of the base joint of the shorter second guide rod. Owing to this simple geometric relationship, a right-angled work space is described in a simple manner for the work spindle as this connecting line follows at right angles to the track.

As machining operations are to be carried out on the workpiece using the machine tool, it is favourably proposed that the machine tool is separated from the machining space by panelling, the panelling being penetrated by the tool spindle. As a result, the situation where swarf removed by the workpiece located in the machining space finds its way into the region of the machine tool and blocks, soils or impairs in some other way the sensitive joints, drives, etc, is avoided. The panelling consists in this case of a movable plate-like curtain consisting of a plurality of parts, wherein the parts can be moved telescopically one on top of the other in such a way that closed panelling results.

In order to secure the panelling it is provided that it is connected at least at a base joint and/or at the tool sleeve to the movement system. In this case it is favourable if the previously described relationship of the short guide rod to the two parts of the long guide rod prevails, so the position of the axis of rotation of the tool spindle in relation to the base axis of the base joint is already fixed in the space or is still undetermined in one dimension only and in this case in particular, for example, the panelling is already guided at two points by an appropriate guide and therefore the danger of vibrations, fluttering or other instabilities in the panelling during operation, in particular in the event of large accelerations, is considerably reduced. The panelling is preferably fixed on two or even three fixing points of the movement system at least with respect to one of the remaining degrees of freedom. It is favourable in this case, when using both base joints, that this connecting line is located at right angles to the line connecting the base joint of the shorter guide rod to the axis of rotation of the tool spindle as the panelling can be connected and secured to the movement system in a simple manner as a result. Consequently, reliable protection of the machine tool against swarf produced in the machining space is achieved in a simple manner, which protection is accompanied by simple control of the position of the tool spindle.

In a preferred development of the invention, it is provided that the first long guide rod is designed as a parallelogram-like double guide rod and each part of the double guide rod carries a tool spindle. The guide rod base is accordingly designed so as to be correspondingly elongated in order to receive a second base joint for the second part of the double guide rod. At the top end of the guide rod the parallelogram is closed by a further transverse guide rod, the tool spindle preferably being positioned in relation to the respective parts of the double guide rod to facilitate control. It can however be extremely advantageous for suitable machine tools to deviate from this symmetry. Such a development of the invention results in higher levels of performance in particular with equidistant machining operations which are determined by the length of the transverse guide rod. Furthermore, there is also the possibility of changing the tool on the first tool spindle while machining is taking place at the second tool spindle. For this purpose the tool spindle, which is arranged on a tool sleeve for example, is withdrawn completely, a suitable robot then changing the tool. Owing to the parallel sequence of functions—machining on the one hand and changing of the tool on the other hand—machining times and set-up times are also reduced. A greater degree of effectiveness of such a machine tool results.

In order to make better use of the track, it is proposed that two or more movement systems are arranged on a common track. It does not matter in this case whether the respective movement systems are designed so as to be identical or different. This can be determined by the corresponding intended use. It is also possible, for example, that the track with the movement systems is provided parallel to the machining line and a machining space is not permanently associated with a machine tool but instead a flexible association is obtained. When optimising operating sequences, this can provide considerable simplification and increased efficiency. It is also proposed that two movement systems which are arranged symmetrically to one another are used on one track. In this case, for example, the guide rod base, which is arranged between the two movement systems, can serve both adjacent movement systems. Such a development can, for example, be advantageous with symmetrically designed workpieces as common positioning of the two tool spindles is achieved by a common drive and as a result a plurality of steps can be carried out simultaneously which can also lead to a considerable saving in time.

As a result of the proposal according to the invention, a machine tool which is clearly lighter in mass than the known Cartesian machine tools is achieved. This lower mass means that higher machining speeds and positioning speeds can be implemented with the machine tools according to the invention. It is also possible to accelerate the lower masses more with the same drives or drive forces. However, it is not only the advantages of such a machine tool during operation which are prominent. Such a machine tool according to the invention is also easy to produce as simple geometric elements, namely the guide rods, are to be formed, and it is also possible in the case of the latter to use modern materials such as fibre reinforced plastics materials, in particular glass fibre or carbon fibre reinforced plastics materials, in the region of the guide rods or the joints. An additional reduction in weight is achieved as a result. The above-mentioned materials can of course be used, not only for the joints but also for the guide rods.

BRIEF DESCRIPTION OF THE SEVERAL VIEWS OF THE DRAWING

The invention is illustrated schematically in the drawings, in which:

FIGS. 1 and 2 show respective side views of the machine tool according to the invention and FIG. 3 shows the machine tool according to the invention in a three-dimensional view.

DETAILED DESCRIPTION

Figure 1:
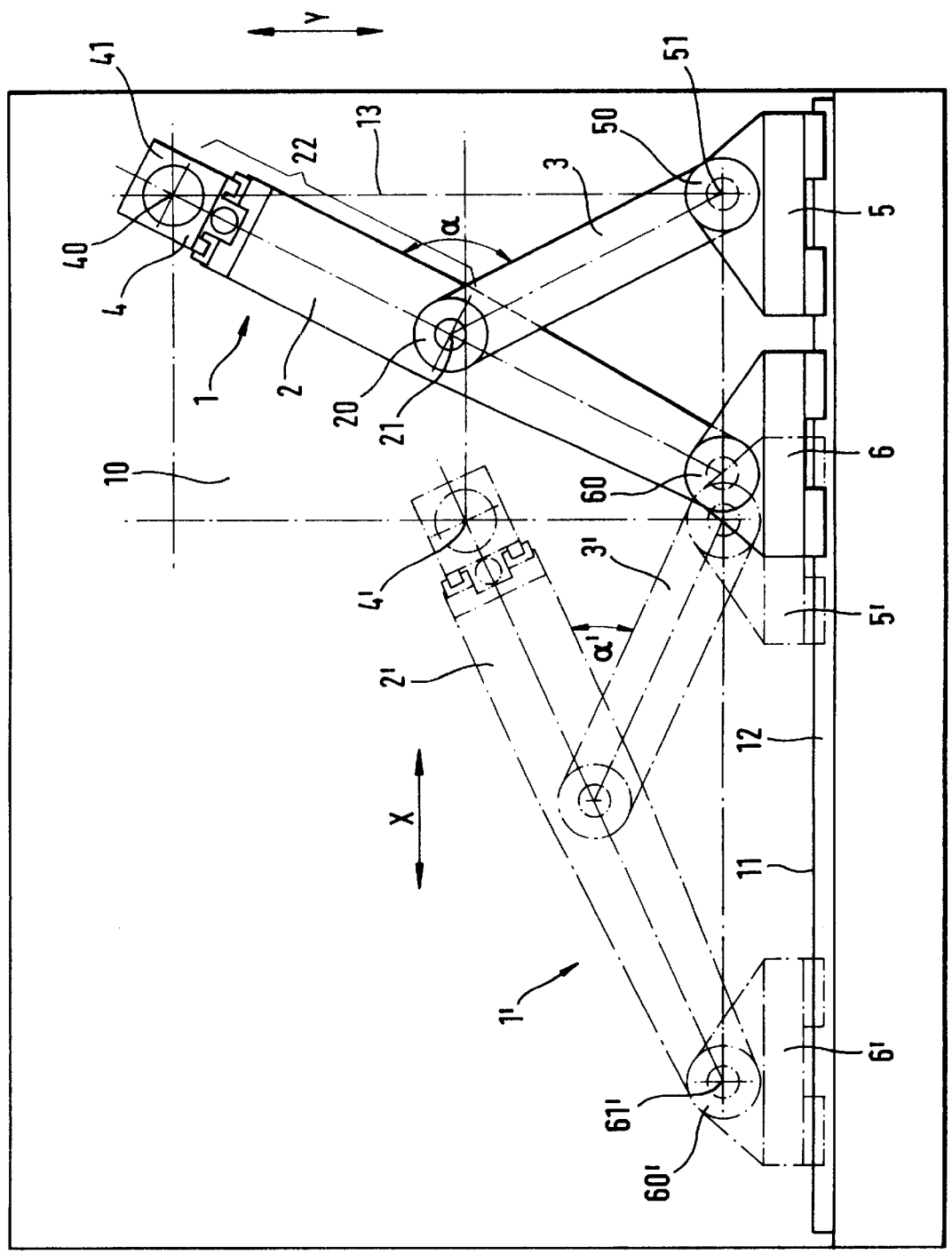

The new concept of the movement system 1 of the machine tool according to the invention is shown most clearly in FIG. 1. FIG. 1 shows two positions of the movement system 1, 1', the second position being shown in dashed lines and the reference numerals pertaining thereto also having an apostrophe.

According to the invention, it is proposed that the movement system 1 comprises at least two guide rods 2, 3 connected to one another in an articulated manner by a guide rod joint 20 and the ends of the guide rods 2, 3 can be moved in opposite directions towards one another and/or with one another. The embodiment illustrated in FIG. 1 is reminiscent of the Greek letter "lambda". It is dominated by a first long guide rod 2 which bears a tool spindle 4 at its upper end. The guide rod 2 is supported in the middle by a second short guide rod 3 which is connected in the region of the guide rod joint to the first guide rod 2 by the guide rod joint 20.

In general it is sufficient that the free ends of the guide rod 2, 3 can be moved on a plane 11 as described. For this purpose, the most varied of concepts are possible. It is also possible that the free ends are not displaceable on a common plane 11, as illustrated, but that various planes, even offset planes are possible. This results in the most varied of possible movements of the work spindle 4.

As illustrated in the drawing, a track 12 is provided on which slide-like guide rod bases 5, 6 can be moved. The respective guide rods 3, 2 are connected in an articulated manner to the guide rod bases 5, 6 by means of base joints 50, 60. The shorter second guide rod 3 is connected to the right-hand guide rod base 5 in this case.

The arrangement of the guide rods via the guide rod bases on a track facilitates moveability of the guide rod bases in the X direction which is indicated by the double arrow. If both guide rod bases 5, 6 are now moved in the same direction on the track 12, to the left for example, the maximum machining width in the X direction of the work space 10 is produced, which width extends to the left beyond the work space 10 indicated by dashed lines and is controlled, for example, for revision or tool change intervals.

The work space 10 or the working plane 10 defined thereby is described as the face over which the work spindle 4 can be moved. In addition to an expansion in the X direction, lifting in the Y direction—see double arrow—is also required for this purpose.

The novel aspect of the machine tool according to the invention is that dependent movement components do not have to be constructed in each case as with the known Cartesian machine tools, resulting in very bulky and heavy machines, rather the same system which is used for movement in the X direction also serves for a movement in the Y direction, whereby no movement of the guide rod bases or the free ends of the guide rods 2, 3 in the same direction preferably being provided, but rather a movement in opposite directions. A movement of the free ends of the guide rods 2, 3 or of the guide rod bases 5, 6 in opposite directions can indicate an approaching movement of the guide rods or a separating movement of the guide rod ends. Such a separating movement can be seen in the left-hand view in FIG. 1 indicated by dashed lines. Owing to the separation of the two guide rod bases 5', 6', the angle $\alpha$ between the two guide rods 2, 3 is reduced to a minimum critical angle. During this movement the work spindle travels from the higher vertical position on the right-hand side into the lower vertical position on the left-hand side while carrying out a lifting movement in the Y direction. It is shown that by using the movement components of the movement system for the X components, a movement component which is at right angles to the first movement component is produced by varying control.

In FIG. 1, left-hand position, the machine tool is simultaneously also moved relatively towards the left, and the maximum work space is designated by 10. It is of course possible that the right-hand guide rod base 5 remains stationary and only the left-hand guide rod base 6 is moved to the left in order to lower the work spindle 4. Ultimately, it depends on the relative movement, in other words the distance between the two guide rod bases 5, 6. It is not necessary for both guide rods 2, 3 to be moved.

It is provided that the angular range α encloses from 30° to 160°, preferably from 45° to 130°, a value of α=125° and α'=approximately 50° being provided in the two critical angles illustrated here.

Figure 2:
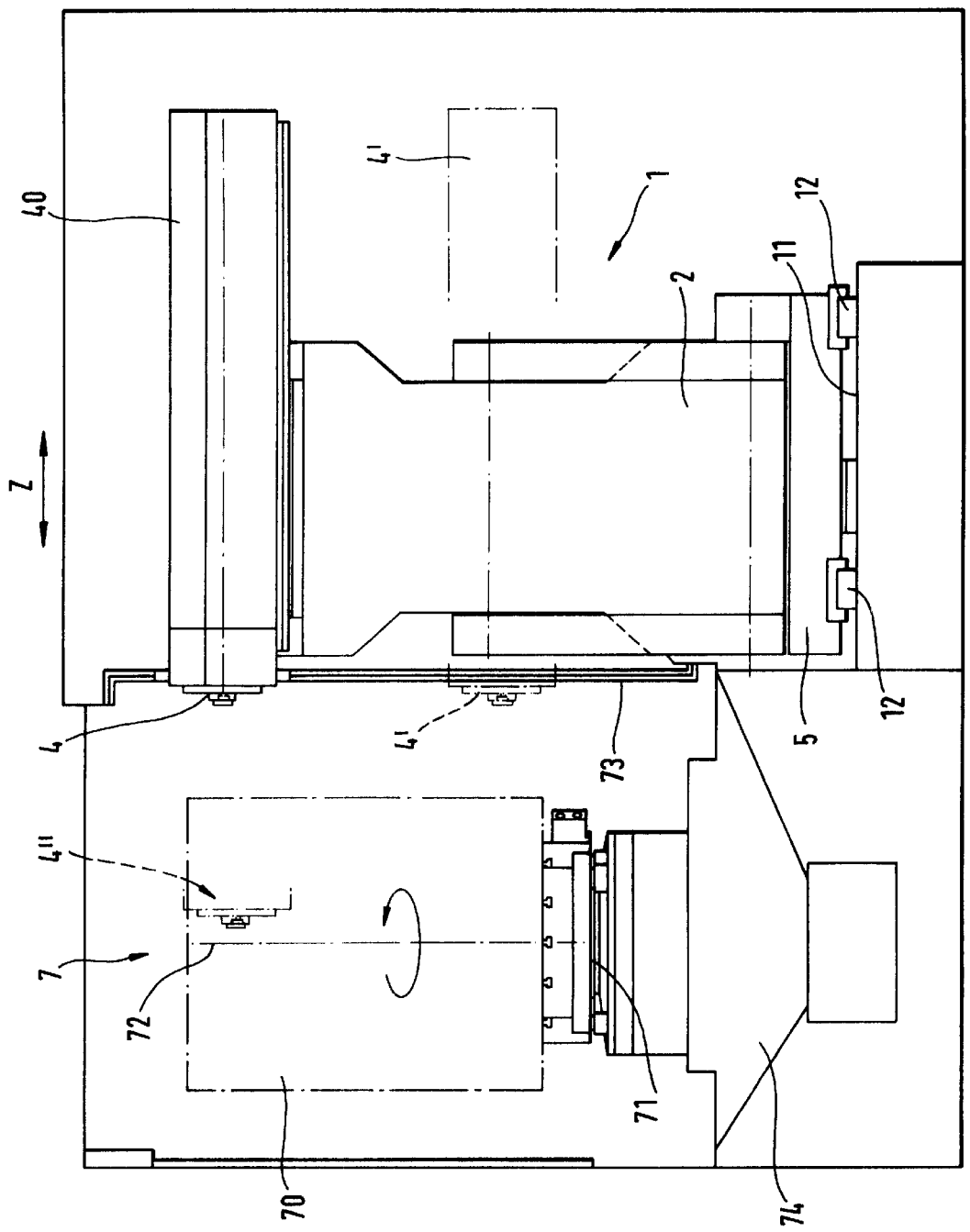

In the embodiment shown in FIGS. 1, 2 and 3 specific ratios are maintained with regard to the effective lengths of the guide rods 2, 3, as a result of which additional favourable properties are produced. It is provided that the length of the second guide rod 3 corresponds to the length of the portion of the guide rod 22, wherein the lengths relate to the respective axes. Here, the base joint axis about which the respective base joint 50, 60 rotates, is designated by 51 or 61. The guide rod joint axis 21 is provided on the guide rod joint 20 (arranged in this example in the middle of the first guide rod 2). The effective length is in this case the distance between the relevant axes, the length of the portion of the guide rod 22 being defined by the distance between the axis of rotation 40 of the work spindle 4 and the guide rod joint axis 21. As a result of this condition, owing to the portion of the guide rod 22 and the second guide rod 3, an isosceles triangle is formed with the effect that the axis of rotation 40 of the work spindle 4 is located exactly above the base joint axis 51 of the base joint 50 of the shorter second guide rod 3.

If, with these geometric conditions, the left-hand guide rod base 6 is now moved to the left as described, the work spindle travels at a right angle and therefore exactly vertically from top to bottom along the line designated 13 with a horizontal alignment of the movement direction of the guide rod base 6 (on its track 12). It is advantageous in this case that such a movement is carried out without complex interpolation calculations. Owing to the simple geometric conditions, a simple control of the guide rod base 6 is only necessary in order to achieve this completely straight movement. A further advantage of this development also lies in the fact that the edge 13 is produced at right angles to the longitudinal extension of the track 12 and a right-angled work space or a working plane 10 is therefore produced.

The interpolation calculations otherwise required with complicated machine concepts can be avoided completely owing to the proposal according to the invention, whereby simple geometric relationships are sufficient to achieve exact machining results by the machine tool.

It is provided that the work spindle 4 is arranged on the first long guide rod 2. The work spindle 4 is favourably mounted in a sleeve 41, the sleeve 41 permitting a moveability, as illustrated here, at right angles to the second plane or working plane 10. This moveability is designated in particular in FIG. 2 by Z (double arrow). Usually, the work spindle is screwed down against the workpiece 70 by this Z component or the machining forward movement is carried out. With machining operations, a movement along the X or Y axes can only occur with the aid of a displacement of one or both guide rod bases 5, 6 during machining, in other words engagement of the tool in the workpiece 70.

It has been described that for complex applications the sleeve 41 can also be mounted rotatably on the guide rod 2 in order to be able to carry out additional machining steps with a fourth axis. Of course it is also possible to provide a fifth axis here.

The essential factor in the above-described geometric property of the same lengths is the connection of the panelling 73 to the movement system 1 in particular. The same thing can of course also be achieved with other geometries of the guide rods.

It is provided that the workpiece 70 is located in a machining space 7, wherein the workpiece 70 is clamped and held on a tool holder 71, wherein the tool holder 71 is designed as a pallet or other holder, for example, and can be rotated at the machining place, for example, about a vertical stationary axis of rotation 72 in order to permit machining of the workpiece 70 by the work spindle 4 on more than one side.

Machining processes such as milling or drilling are regularly carried out on such workpieces 70 and panelling 73 must be provided between the machining space 7 and the space of the work spindle 4 or the machine tool in order for the smooth functioning of the machine tool not to be impaired by the fine swarf or rubbed-off parts. Care is to be taken in particular, since the movement system consists of a track 12, that such swarf does not get into the sensitive drives and cause damage there.

It is therefore provided according to the invention in a preferred development that panelling 73 is arranged which is penetrated by the tool spindle 4.

A swarf collector 74 is provided beneath the workpiece 70 for optimum removal of swarf, which collector is designed in the manner of a funnel or channel and collects the swarf in a sufficiently well known swarf conveyer belt. The funnel-like swarf collector is favourably designed in such a way that its outer edge extends behind the edge of the panelling 73 and can therefore collect all swarf which rains under the panelling in the manner of a funnel or channel.

Whilst it is not illustrated in the drawings, the chosen geometric conditions allow simple and reliable guidance of the panelling to the movement system, whereby guide rails are favourably provided on the panelling in order, for example, to connect the point of penetration of the work spindle through the panelling or one or both base joints 50, 60 to the panelling 73.

The maximum possible forward movement in the Z direction by the work spindle is designated in FIG. 2 by 4".

In addition to the example shown here, in which the movement system or the entire machine tool stands on the floor, all possible orientations of the movement system in the space are of course possible without difficulty, i.e. suspended from above, supported from below (with the Z axis in the vertical direction) or at acute angles or diagonals even.

The claims filed now with the application and the claims filed later are attempts at wording which does not prejudice granting of more extensive protection.

The references mentioned in the dependent claims refer to the further development of the subject of the main claim by the features of the respective sub-claim. However, these are not to be understood as a relinquishment of the objective of independent protection of the subject for the features of the sub-claims referred to.

Features which were hitherto disclosed only in the description, can, in the course of the process, be claimed as being of essential importance to the invention, as a limitation from the state of the art for example.

What is claimed is:

1. A machine tool comprising:
    at least one tool spindle moveable and positionable in at least one working plane by a movement system,
    said movement system including at least two guide rods connected to one another in an articulated manner by a guide rod joint,
    each of said guide rods having two ends,
    one end of said two ends of each of said guide rods being moveable in (a) opposite relative directions towards and apart from one another and (b) simultaneously in the same direction,
    said one end of each of said guide rods being moved along a common guide path.

2. The machine tool according to claim 1, wherein said guide rods are supported in the same plane.

3. The machine tool according to claim 1, wherein each of said guide rods is mounted in an articulated manner on a guide rod base by a base joint.

4. The machine tool according to claim 3, wherein said guide rod bases are mounted on a track.

5. The machine tool according to claim 1, wherein said machine tool is separated from a machining space by panelling which is penetrated by said tool spindle.

6. The machine tool according to claim 3, wherein said guide rod joint and said base joints have axes of rotation, and said axes of rotation of said guide rod joint and of said base joints are arranged parallel to one another.

7. The machine tool according to claim 1, wherein said guide rods enclose an angular range of 30° to 160°.

8. The machine tool according to claim 7, wherein said angular range is 45° to 130°.

9. The machine tool according to claim 1, wherein said tool spindle is designed as a tool sleeve and said tool spindle can be moved at a right angle to said working plane.

10. The machine tool according to claim 1, wherein a portion of one of said guide rods is equal in length to the other of said guide rods.

11. The machine tool according to claim 1, wherein said guide rods are of different lengths and a longer first guide rod carries said tool spindle.

12. The machine tool according to claim 11, wherein second guide rod has a length which corresponds to the length of a portion of said longer first guide rod which extends from said guide rod joint to said tool spindle.

13. The machine tool according to claim 11, wherein said guide rod joint is located on said longer first guide rod between said drive spindle and a guide rod base arranged at said free end of said longer first guide rod.

14. The machine tool according to claim 11, wherein said guide rod joint is located in a middle of said longer first guide rod.

* * * * *